Sept. 9, 1969          G. W. BOYLE          3,465,558
LOCK FOR A GEAR SHIFT
Filed March 12, 1968
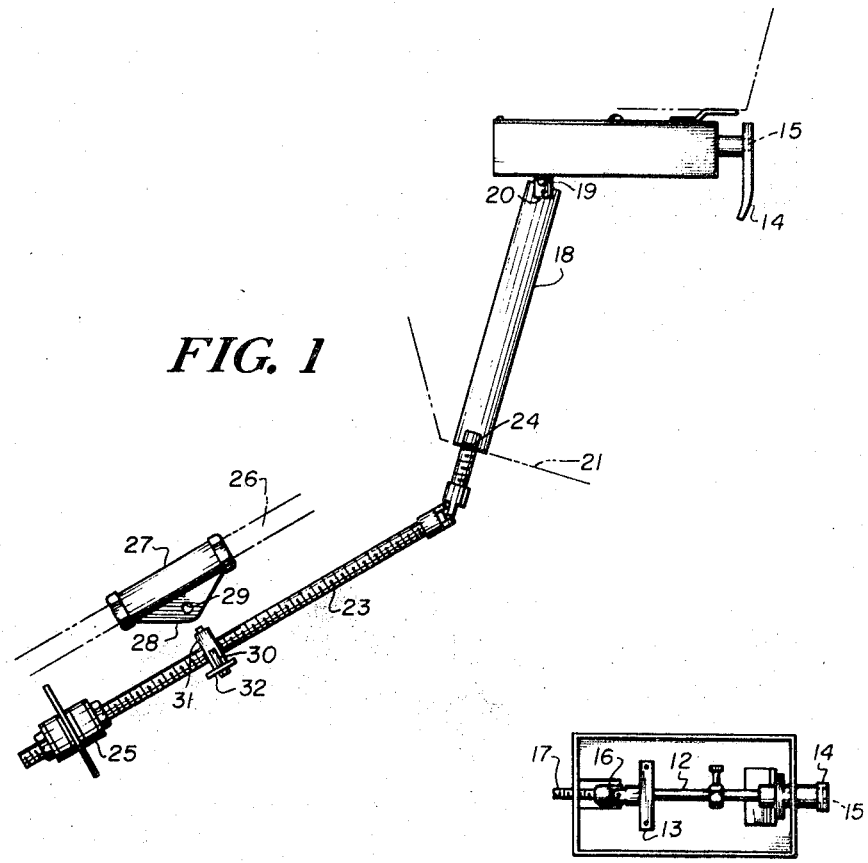
FIG. 1
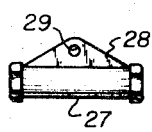
FIG. 2
FIG. 3
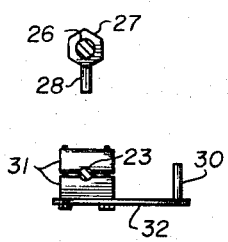
FIG. 4
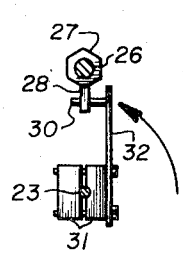
FIG. 5
INVENTOR.
GEORGE W. BOYLE
BY Popper, Bain & Bobis
ATTORNEYS United States Patent Office 3,465,558
Patented Sept. 9, 1969

3,465,558
LOCK FOR A GEAR SHIFT
George W. Boyle, 49 Garden St.,
Ridgefield Park, N.J. 07660
Filed Mar. 12, 1968, Ser. No. 712,468
Int. Cl. G05g 5/00; E05b 65/12, 63/00
U.S. Cl. 70—181
1 Claim

ABSTRACT OF THE DISCLOSURE

A lock for a gear shift in which the gear shift rod assembly has an orifice positioned to receive a locking pin when the gear shift rod has adjusted the gears to neutral position; a locking lever is movable to shift a pin into engagement with the orifice in the gear shift rod thereby immobilizing the rod against further movement and maintaining the gears in neutral position; a keyed lock in the locking lever secures the locking lever against movement.

---

With the production of motor vehicles in large volume, the differentiation of motor vehicle ignition keys becomes increasingly difficult and sets of such keys capable of fitting many motor vehicles are readily available. It has been found that it is possible to design an accessory gear shift lock incorporating a relatively unique keyed lock. This gear shift lock is designed to be tamper-proof and prevents the motor vehicle from being placed in gear and moved under its own motor power except upon the application of the proper key. The device may also be incorporated as a standard part of an automobile. Its objective is primarily to make it much more difficult for unauthorized persons to operate the motor vehicle to which the gear shift lock is attached.

These objects and advantages as well as other objects and advantages may be attained by the device shown by way of illustration in the drawings in which:

FIGURE 1 is a side elevational view of the lock for a gear shift applied to a motor vehicle;

FIGURE 2 is a top plan view of the driving elements of the gear shift lock located within a housing attached to the motor vehicle;

FIGURE 3 is a side elevational view of a pin socket before attached to a gear shift rod of a motor vehicle;

FIGURE 4 is an end view of a pin socket and a pin disengaged from each other; and FIGURE 5 is an end view of a pin socket with a pin engaged therewith in locking relation thereto.

Referring now to the drawings in detail, the lock for a gear shift lever provides a housing 11 adapted to be rapidly attached to the dashboard of a motor vehicle so that a lock handle thereof extends outwardly from the dashboard. A rotatable shaft 12 is attached by a bracket 13 to the inside of the housing. The shaft 12 extends through the housing 11 and has a handle 14 attached at the end thereof for rotating the shaft 12. A lock 15 is located within the handle 14 to provide means for immobilizing the handle 14, until the key for the lock positions the lock in disengaged relationship to the housing.

The other end of the shaft 12 has a universal joint 16 which is attached to a connecting rod 17. A rigid strong cover 18 encloses the connecting rod 17; the connecting rod 17 is pivotably attached to the housing by a pair of brackets 19 and a pin 20. The bottom of the housing extends to the floor board 21 where a pair of L-brackets 24 on the housing 18 secure the housing to the floor board 21. It will thereby be seen that the shaft 17 is fully enclosed and protected against tampering. The end of the shaft 17 is passed through the floor board 21 and terminate in another universal joint 22. This universal joint 22 is attached to another connecting rod 23. The bottom of the connecting rod 23 is rotatable captured in a socket 25 that is attached to the motor vehicle frame to rotatably stabilize the end of the connecting rod 23.

The connecing rod 23 is positioned adjacent to the gear shift rod 26 of the gear box. A pin-socket lock 27 is mounted on the gear shift rod 26. The lock 27 has a tab 28 with a hole 29 for a lock pin 30.

The connecting rod 23 carries a pair of blocks 31 and a plate 32 which are bolted thereon. The plate 32 is the mounting for the lock pin 30.

When the handle 14 is turned, the shaft 12 rotates the rods 17, 23 thereby swinging the lock pin 30 into the hole 29, which is accurately positioned to receive the pin 30 when the gear shift rod has placed the gears in neutral. The lock 15 is then secured. The pin 30 and the hole 29 holds the gear shift rod 26 against any movement. The motor vehicle cannot be moved under its own motor power until the lock 15 is unlocked, and the pin 30 is disengaged from the hole 29 thereby permitting movement of the gear shift rod.

The foregoing description is merely intended to illustrate an embodiment of the invention. The component parts have been shown and described. They each may have substitutes which may perform a substantially similar function; such substitutes may be known as proper substitutes for the said components and may have actually been known or invented before the present invention.

What is claimed:
1. A gearshift lock for a motor vehicle provided with a gear shift rod comprising:
(a) a lock pin socket on the gear shift rod,
(b) a lock pin positioned in spaced relation to the pin socket,
(c) a rotatable mounting for the lock pin movable to enter the lock pin into the lock pin socket,
(d) a handle to rotate the mounting attached to the mounting,
(e) a lock for the handle to prevent it from rotating,
(f) a protective housing for the rotatable mounting, to resist tampering,
(g) a protective housing for the handle where it is attached to the mounting, to resist tampering,
  wherein the protective housing for the handle is secured underneath the dashboard,
  the protective housing for the rotatable mounting extends to the floor board of the motor vehicle, and
  the lower end of the rotatable mounting uncovered by the protective housing extends below the floorboard of the motor vehicle.

References Cited

UNITED STATES PATENTS

| | | | |
|---|---|---|---|
| Re.16,123 | 7/1925 | Schonwald | 70—417 |
| 1,276,117 | 8/1918 | Riebe | 64—4 |
| 1,646,970 | 10/1927 | Martel | 70—248 |
| 1,792,990 | 2/1931 | La Van Way | 70—254 |
| 1,802,114 | 4/1931 | Kampmen | 70—202 |
| 1,940,797 | 12/1933 | Staples | 70—247 |
| 2,933,916 | 4/1960 | Dean | 70—192 |
| 3,022,391 | 2/1962 | Oravee | 200—44 |
| 3,400,563 | 9/1968 | Lempke | 70—184 |

MARVIN A. CHAMPION, Primary Examiner

R. L. WOLFE, Assistant Examiner

U.S. Cl. X.R.

70—202, 216, 237, 417